United States Patent
Novick et al.

(10) Patent No.: US 7,072,292 B2
(45) Date of Patent: Jul. 4, 2006

(54) METHODS AND APPARATUS FOR SUPPORTING MULTIPLE UTOPIA MASTERS ON THE SAME UTOPIA BUS

(75) Inventors: Ronald P. Novick, Orange, CT (US); Didier P. Nicoulaz, Crissier (CH); Diego Marty, Ecublens (CH)

(73) Assignee: Transwitch Corporation, Shelton, CT (US)

( * ) Notice: Subject to any disclaimer, the term of this patent is extended or adjusted under 35 U.S.C. 154(b) by 975 days.

(21) Appl. No.: 10/068,168

(22) Filed: Nov. 13, 2001

(65) Prior Publication Data

US 2003/0091051 A1    May 15, 2003

(51) Int. Cl.
*G01R 31/08* (2006.01)
*H04L 12/28* (2006.01)

(52) U.S. Cl. .................................. 370/217; 370/395.1
(58) Field of Classification Search ............... 370/360, 370/421, 423, 438, 450–1, 395.1, 395.6, 370/395.7, 419, 217
See application file for complete search history.

(56) References Cited

U.S. PATENT DOCUMENTS

| | | | |
|---|---|---|---|
| 3,932,841 A * | 1/1976 | Deerfield et al. ............ 710/107 |
| 4,596,012 A * | 6/1986 | Reed ........................... 370/462 |
| 4,818,985 A * | 4/1989 | Ikeda ....................... 340/825.5 |
| 5,416,910 A * | 5/1995 | Moyer et al. ................ 710/113 |
| 6,307,858 B1 * | 10/2001 | Mizukoshi et al. ..... 370/395.71 |
| 6,418,144 B1 * | 7/2002 | Saeki ....................... 370/395.6 |
| 6,680,904 B1 * | 1/2004 | Kaplan et al. ............... 370/217 |
| 2002/0021661 A1 * | 2/2002 | DeGrandpre et al. ....... 370/219 |
| 2002/0051454 A1 * | 5/2002 | Yoon ........................ 370/395.1 |
| 2002/0126660 A1 * | 9/2002 | Watanabe et al. ........... 370/364 |
| 2002/0131433 A1 * | 9/2002 | Rumer ........................ 370/411 |
| 2003/0043790 A1 * | 3/2003 | Gutierrez .................... 370/362 |

OTHER PUBLICATIONS

Fred Halsall, "Data Communications, Computer Networks and Open Systems", 3rd Edition, by Fred Halsall, © 1992, Addison-Wesley, p. 196-197.*
Microchip AN579, "Using the 8-Bit Parallel Slave Port" description, © 1997.*
The ATM Forum, Technical Committee, Utopia Specification, Level 1, Version 2.01, af-phy-0017.000, Mar. 21, 1994, 15 pages.
The ATM Forum, Technical Committee, Utopia Level 2, Version 1.0, af-phy-0039.000, Jun. 1995, 66 pages.
The ATM Forum, Technical Committee, Utopia 3 Physical Layer Interface, af-phy-0136.000, Nov. 1999, 40 pages.
Lucent Technologies, ATM UTOPIA Slave Bridge, Product Brief, Aug. 2000, 2 pages.

* cited by examiner

*Primary Examiner*—Chau Nguyen
*Assistant Examiner*—Warner Wong
(74) *Attorney, Agent, or Firm*—Gordon & Jacobson, P.C.

(57) ABSTRACT

Methods and apparatus for supporting multiple UTOPIA bus masters on a single UTOPIA bus include coupling two UTOPIA bus masters via three signal lines (Ready, Request, and Grant), designating one of the masters a primary master and the other a secondary master, and coupling both bus masters to the same UTOPIA bus. When receiving cells from the UTOPIA bus, both masters accept cells and screen them (with a lookup table) to determine which cells are addressed to them. When transmitting cells, the primary master normally controls polling and PHY selection. The secondary master asserts the Request line during polling to indicate that it has a cell to send to a PHY that has responded positively to the polling. In response to the Request signal, the primary master asserts the Grant line and control of the bus is given to the secondary master for the next cell cycle. The presently preferred embodiment utilizes an arbitration scheme to assure fairness in allocating control of the bus.

19 Claims, 7 Drawing Sheets

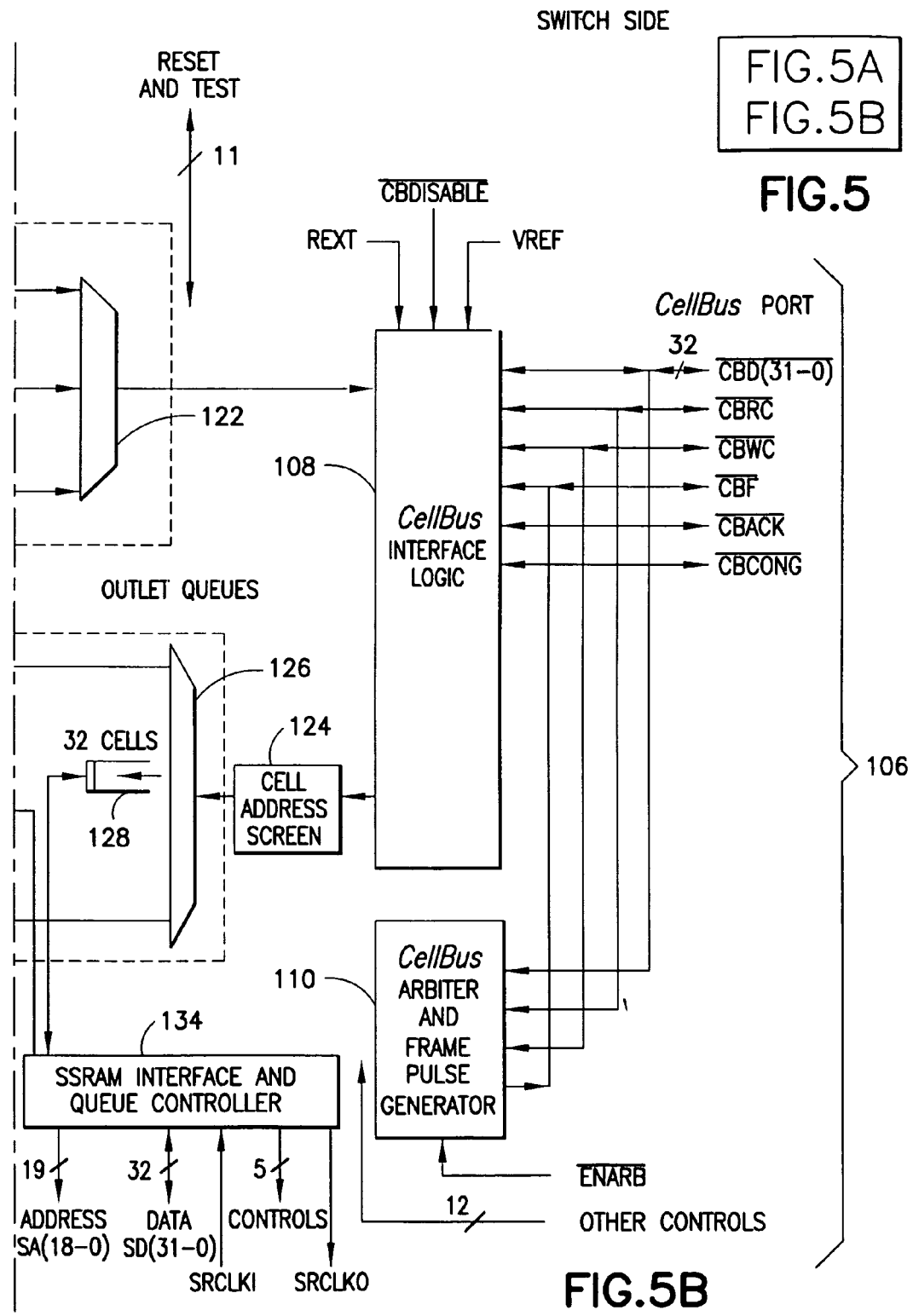

METHODS AND APPARATUS FOR SUPPORTING MULTIPLE UTOPIA MASTERS ON THE SAME UTOPIA BUS

BACKGROUND OF THE INVENTION

1. Field of the Invention

The present invention relates to telecommunications. More particularly, the present invention relates to the passing of high speed Asynchronous Transfer Mode (ATM) data over a standardized Universal Test and Operations Physical Interface for ATM (UTOPIA) bus.

2. State of the Art

Perhaps the most awaited, and now fastest growing technology in the field of telecommunications in the last decade is known as ATM (Asynchronous Transfer Mode) technology. ATM is providing a mechanism for removing performance limitations of local area networks (LANs) and wide area networks (WANs) and providing data transfers at a speed on the order of gigabits/second. Within the ATM technology, a commonly used interface specification between chips on a board for passing ATM cells is the UTOPIA (Universal Test & Operations PHY Interface for ATM) interface. The UTOPIA interface is specified in ATM Forum standard specifications: af-phy-0017.000 (UTOPIA Level 1, Version 2.01 Mar. 21, 1994); af_phy_0039.000 (UTOPIA Level 2, Version 1, June 1995); and af-phy-00136.000 (UTOPIA 3 Physical Layer Interface November 1999) which are hereby incorporated by reference herein in their entireties.

As mentioned above, the UTOPIA interface is defined by the ATM Forum to allow a common interface between the Physical Layer (PHY) and ATM layer in an ATM system. Currently, four levels of UTOPIA interfaces are defined by the ATM Forum to support a wide range of speed and media types from low speed xDSL to high speed OC-192. A typical application of the UTOPIA interface is supporting the connection between an ATM network processor and various PHY devices such as a DSL chip set and/or a SONET framer. UTOPIA may also used as the interface between a switch fabric and an ATM network processor.

UTOPIA supports three operation modes: single PHY operation mode, Multiple PHY (MPHY) with Direct Status Indication operation mode and MPHY with Multiplexed Status Polling operation mode. In the single PHY mode, the UTOPIA interface includes a data bus and a control bus. The operation of UTOPIA in the single PHY mode is relatively simple and straightforward. In MPHY operation mode, the UTOPIA interface includes a data bus, a control bus and an address bus.

The MPHY UTOPIA transmit interface includes the following signals: transmit data (TxData), transmit address (TxAddr), and the transmit control signals including transmit cell available (TxClav), transmit enable (TxEnb*) and transmit start of cell (TxSOC). The receive interface includes the following signals: receive data (RxData), receive address (RxAddr), and the receive control signals including receive cell available (RxClav), receive enable (RxEnb*) and receive start of cell (RxSOC). A MPHY device may consist of multiple logical PHY ports. Each PHY port has a one-to-one correspondence with a PHY Port address that is related to a UTOPIA address and Clav (Cell buffer available) signal.

Prior art FIG. 1 illustrates an example of a UTOPIA Level 2 interface supporting MPHY with Multiplexed Status Polling operation. Multiplexed Status Polling is mainly used in actual applications. As shown in FIG. 1, a transmit clock signal (TxClk) is used to clock control signals and data signals in the transmit direction (from the ATM device to the PHY devices). The TxData[15:0] signal is a 16-bit UTOPIA transmit data bus. The assertion of TxEnb* is coincident with the start of the cell transfer. TxSOC is used to indicate the start of cell position. TxClav is used to indicate that the PHY layer device is ready to receive a cell from the ATM layer device. TxAddr[4:0] is the UTOPIA address and is used to poll and select the appropriate MPHY device.

At the UTOPIA transmit interface, the ATM layer device polls the TxClav status of a PHY layer device by placing a specified address on the TxAddr bus for one clock cycle. The PHY layer device which is associated with the address on the TxAddr bus drives TxClav high (or low) during the next clock cycle during which the ATM device places a null address (1F) on the TxAddr bus. The ATM layer device checks TxClav at a certain time after it issues TxAddr. Based on polled TxClav information, the ATM layer device can select a PHY device and transfer data to this PHY device by driving TxEnb*, TxAddr, and TxSOC signals.

Similarly, RxClk is the receive clock signal that is used to clock control signals and data in the receive direction (from the PHY device to the ATM device). RxData[15:0] is a 16-bit UTOPIA Receive bus. The assertion of RxEnb* is coincident with the start of the cell transfer. RxSOC is used to indicate the start of cell position. RxClav is used to indicate that the PHY layer device is ready to Receive a cell from the ATM layer device. RxAddr[4:0] is the UTOPIA address of the PHY device and is used by the ATM device to poll and select the appropriate PHY device in the receive direction.

At the UTOPIA receive interface, the ATM layer device polls the RxClav status of a PHY layer device by placing a specified address on RxAddr bus for one clock cycle. The PHY layer device which is associated with the address on the RxAddr bus drives RxClav high (or low) during the next clock cycle during which the ATM device places a null address (1F) on the RxAddr bus. The ATM layer device checks RxClav at a certain time after it issues RxAddr. Based on polled RxClav information, the ATM layer device can select a PHY device and receive data from this PHY device by driving RxEnb* and RxAddr signals.

Certain timing requirements must be met for the Multiplexed Status Polling operation of the UTOPIA interface so that the ATM layer device can correctly detect Clav (Cell buffer available) information. FIG. 2 depicts the timing requirement for UTOPIA level 2 address polling. An ATM device starts driving UTOPIA address N at time t1. The PHY device having address N responds to address polling by driving the Clav signal high (or low) at time t2. The Clav becomes valid for the ATM device at time t3 (after transmission delay) as illustrated by the last line of the timing diagram. The ATM device checks the Clav signal at time t4 in order to accommodate a certain amount of transmission delay. To guarantee correct operation, the Clav signal must be valid before it is checked by ATM device, i.e. at some t3<t4. This is a necessary timing requirement for the UTOPIA interface.

From the foregoing, it will be appreciated that UTOPIA allows many PHY devices to communicate with one ATM layer device. Access to the UTOPIA bus is controlled by the ATM layer device which is considered the bus "master". The PHY devices are thus considered bus "slaves". It would be desirable, however, to allow more than one ATM layer device to be coupled to the same UTOPIA bus so as to provide either redundancy or load sharing.

SUMMARY OF THE INVENTION

It is therefore an object of the invention to provide methods and apparatus for supporting multiple UTOPIA masters on the same UTOPIA bus.

It is also an object of the invention to provide methods by which multiple ATM layer devices can share a single UTOPIA bus.

It is another object of the invention to provide methods and apparatus for supporting multiple UTOPIA masters on the same UTOPIA bus which do not require any modification of the standard UTOPIA bus.

It is still another object of the invention to provide ATM layer devices which communicate outside the UTOPIA bus in order to share control of the UTOPIA bus.

In accord with these objects which will be discussed in detail below, the methods of the present invention include coupling two UTOPIA bus masters via three signal lines (Ready, Request, and Grant), designating one of the masters a primary master and the other a secondary master, and coupling both bus masters to the same UTOPIA bus. When receiving cells from the UTOPIA bus, the secondary master asserts the Ready line when its buffer has room to accept a cell. The primary master will not assert the UTOPIA RxEnb unless the Ready line is asserted. When RxEnb is asserted, both masters accept cells and screen them (with a lookup table) to determine which cells are addressed to them. When transmitting cells, the primary master normally controls polling and PHY selection. The secondary master asserts the Request line during polling to indicate that it has a cell to send to a PHY that has responded positively to the polling. In response to the Request signal, the primary master asserts the Grant line and control of the bus is given to the secondary master for the next cell cycle. According to one embodiment, if the secondary master fails to assert the Ready line for more than one cell time, it is assumed to be malfunctioning and is ignored until it is reset. The presently preferred embodiment utilizes an arbitration scheme to assure fairness in allocating control of the bus. The presently preferred arbitration scheme requires that both bus masters maintain a "scoreboard" of all PHYs indicating (with one bit for each PHY) the results of the most recent poll (i.e. which PHYs asserted the CLAV line). Each time a PHY is selected by either master, the corresponding CLAV bit in the scoreboard is reset. Neither master may select a PHY unless the corresponding CLAV bit is set in the scoreboard. According to the presently preferred embodiment, when control of the bus is relinquished by either master, a dead cycle follows during which neither master controls the bus and a weak pullup maintains all signals in the high state.

The apparatus of the invention includes a modified ATM layer device having a UTOPIA interface and means for coupling it via Ready, Request, and Grant lines to another such device. The modified device also includes logic for carrying out the methods of the invention. The presently preferred apparatus is based on the Transwitch® Cubit® Multi-PHY CellBus® Access Device. A single device can be either primary or secondary master. The designation is made with a lead strap.

Additional objects and advantages of the invention will become apparent to those skilled in the art upon reference to the detailed description taken in conjunction with the provided figures.

BRIEF DESCRIPTION OF THE APPENDIX

The Compact Disk appendix contains a 120 page data sheet describing the presently preferred embodiment of the invention. The Compact Disk is formatted for a Macintosh® computer and contains a single file in Adobes® Acrobats® format.

DETAILED DESCRIPTION OF THE PREFERRED EMBODIMENTS

Figure 1:
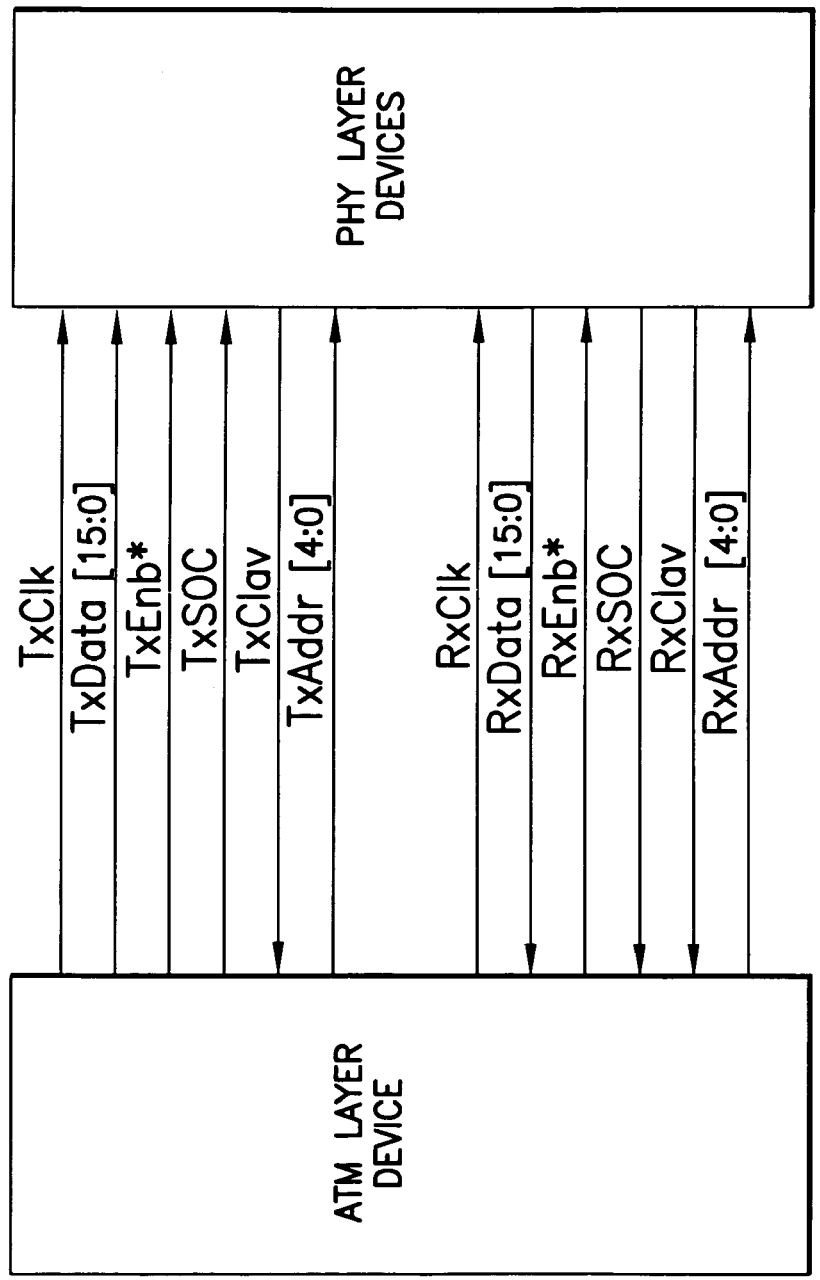
FIG. 1 is an illustration of a prior art UTOPIA ATM interface.
Figure 2:
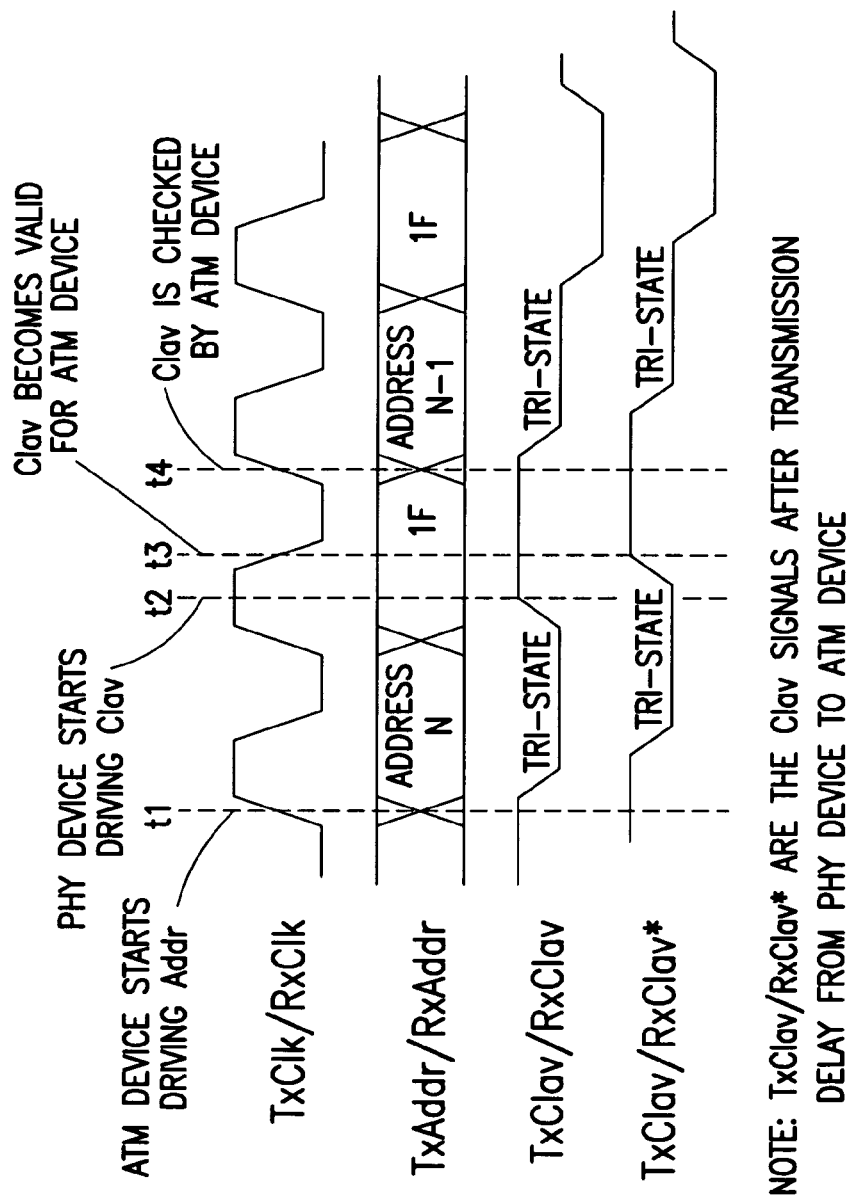
FIG. 2 is a simplified prior art timing diagram illustrating the polling of PHY layer devices by an ATM layer device.
Figure 3:
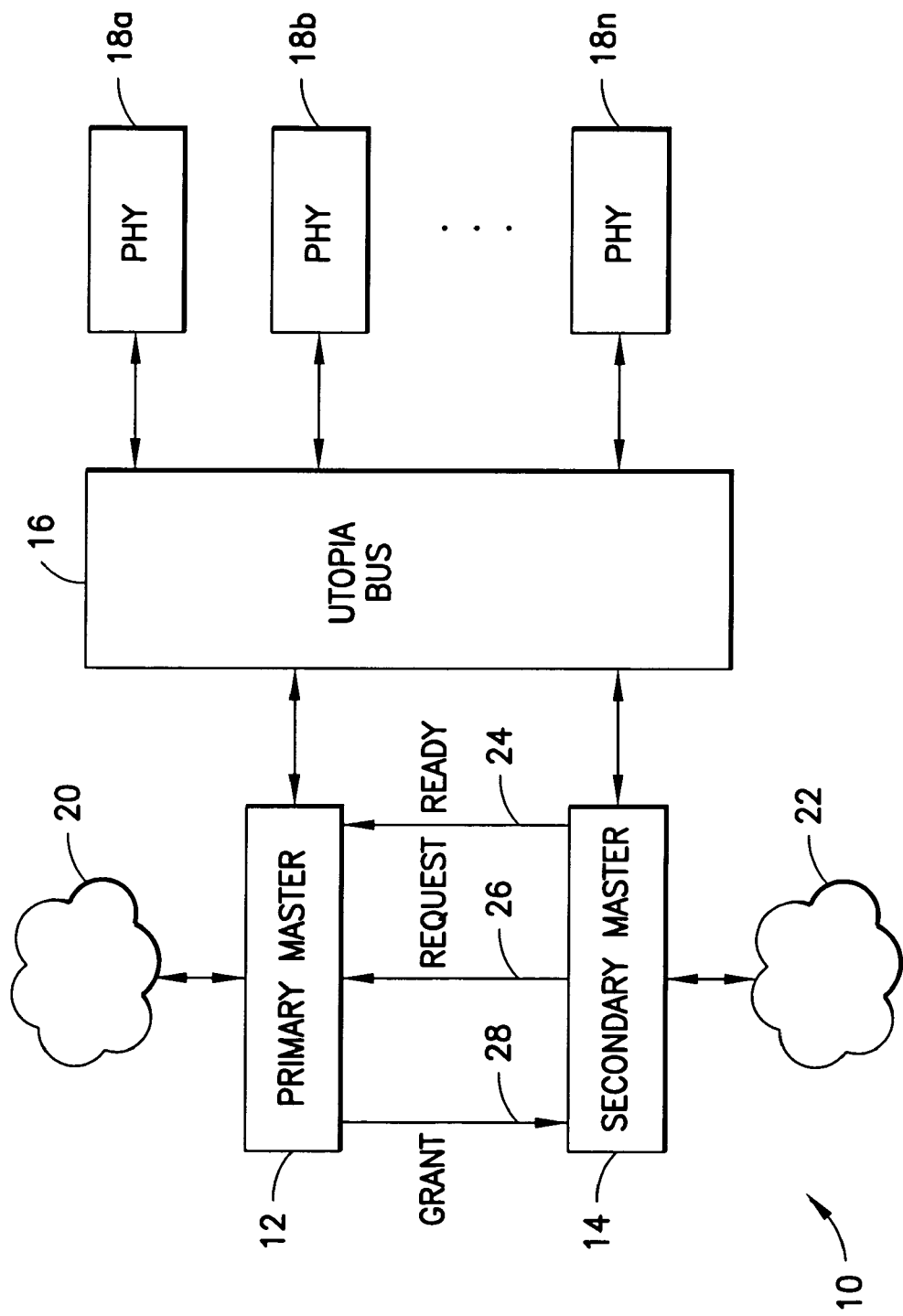
FIG. 3 is a simplified block diagram illustrating an embodiment of the invention in conjunction with a UTOPIA bus and a plurality of PHY devices.

Referring now to FIG. 3, an arrangement 10 according to the invention includes a first bus master 12 and a second bus master 14, both coupled to the same UTOPIA bus 16 which is coupled to multiple PHY devices 18a, 18b, . . . , 18n. The first bus master 12 is coupled to an ATM layer device or network 20 and the second bus master 14 is coupled to an ATM layer device or network 22. According to the invention, the two bus masters 12, 14 are coupled to each other by three signal lines, Ready 24, Request 26, and Grant 28. In addition, one of the bus masters is designated the "primary" bus master and the other is designated the "secondary" bus master. As shown in FIG. 3, bus master 12 is the primary bus master and bus master 14 is the secondary bus master. The arrows on the signal lines 24, 26, and 28 reflect the relationship between primary and secondary bus masters. The secondary bus master 14 asserts the ready 24 and request 26 signals and the primary bus master 12 asserts the grant 28 signal.

According to the methods of the invention, when receiving cells from the UTOPIA bus 16, the secondary master 14 asserts the Ready line 24 when its buffer has room to accept a cell. The primary master 12 will not assert the UTOPIA RxEnb unless the Ready line 24 is asserted. When RxEnb is asserted, both masters 12 and 14 accept cells and screen them (with a lookup table described in more detail below with reference to FIG. 5) to determine which cells should be forwarded and which should be ignored. According to one embodiment, if the secondary master 14 fails to assert the Ready line 24 for more than one cell time (approximately one microsecond, it is assumed to be malfunctioning and is ignored until it is reset. This is a fail-safe mechanism so that a malfunction in the secondary master does not halt the operation of the primary master.

When transmitting cells to the UTOPIA bus 16, the primary master 12 normally controls polling and PHY selection. This is illustrated in the timing diagram of FIG.

4a. For example, the primary master polls an address at time $t_0$. The null address (1F is placed on the address bus during the next clock cycle during which the polled PHY device replies. A PHY device is selected in the following clock cycle starting at time $t_1$.

Figure 4A:
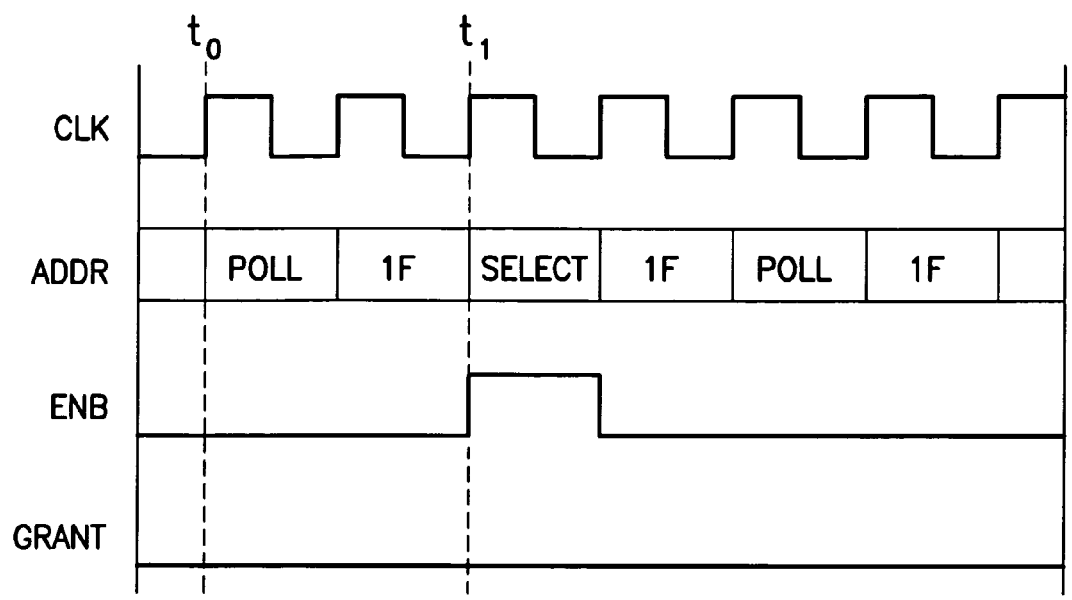
FIG. 4a is a timing diagram illustrating the UTOPIA selection process when the primary master is in control of the bus.
Figure 4B:
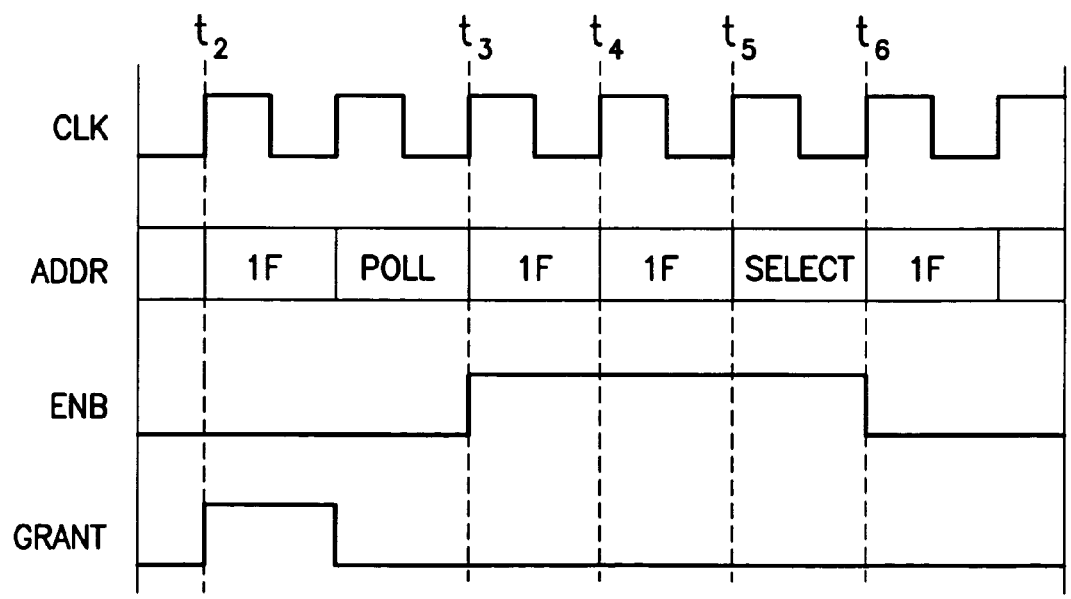
FIG. 4b is a timing diagram illustrating transfer of control to the secondary master and the UTOPIA selection process by the secondary master.

When the secondary master has a cell to transmit, it asserts the Request line 26 during polling to indicate that it has a cell to send to a PHY that has responded positively to the polling. In response to the Request signal, the primary master asserts the Grant line 28 and control of the bus 16 is given to the secondary master for the next cell cycle. This is illustrated in FIG. 4b where the grant is issued at time $t_2$. The primary master continues to control the bus until time $t_3$ when it tristates the TxEnb line of the UTOPIA bus. The clock cycle starting at $t_4$ is a "dead cycle" during which neither bus master controls the bus and all signals are held in the high state. The secondary master takes control of the bus at time $t_5$. Selection of the PHY device to receive a cell from the secondary master is effected at time $t_6$. During cell transfer, the secondary master continues to poll the address bus from the last address polled by the primary master. Unless the secondary master re-asserts the Request line and receives a Grant signal from the primary master before completing cell transfer, control of the bus is returned to the primary master when the secondary master completes cell transfer.

The presently preferred embodiment utilizes an arbitration scheme to assure fairness in allocating control of the bus. The presently preferred arbitration scheme requires that both bus masters maintain a "scoreboard" of all PHYs indicating (with one bit for each PHY) the results of the most recent poll (i.e. which PHYs asserted the CLAV line). Each time a PHY is selected by either master, the corresponding CLAV bit in the scoreboard is reset. Neither master may select a PHY unless the corresponding CLAV bit is set in the scoreboard. When both masters need to use the bus, the primary master alternates control of the bus with the secondary master.

Figure 5A:
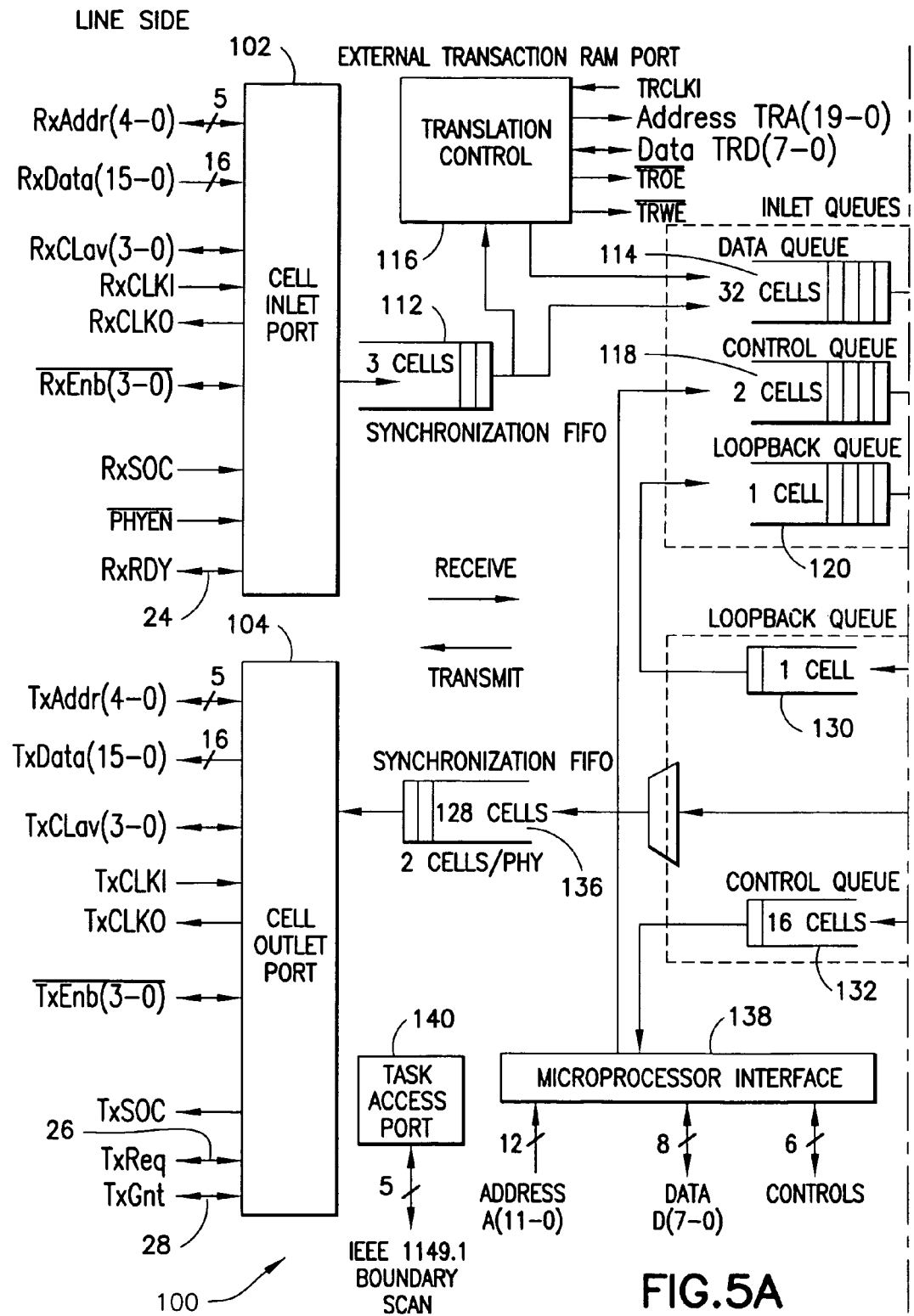
FIG. 5 is a simplified block diagram illustrating a presently preferred embodiment of the invention.

Referring now to FIG. 5, an exemplary apparatus 100 embodying the invention is based on the Transwitch® Cubit® family of devices. The apparatus 100 has an "inlet side" and a "switch side". The inlet side comprises a UTOPIA interface which includes a cell inlet port 102 for receiving cell from a UTOPIA bus and a cell outlet port 104 for transmitting cells to the UTOPIA bus. As seen in FIG. 5, the aforementioned Ready line 24 is illustrated as part (RxRDY) of the cell inlet port 102. The aforementioned Request 26 and Grant 28 lines are shown as part (TxReq and TxGnt) of the cell outlet port 104. These three control lines are illustrated in FIG. 5 with bidirectional arrows because the apparatus 100 can be configured to act as either a primary or secondary master. The outlet side of the apparatus comprises a CellBus® interface 106 which includes interface logic 108 and an arbiter and frame pulse generator 110. A number of buffers, multiplexers and demultiplexers control the flow of traffic between the inlet side and the switch side. In addition, a number of interfaces to other external devices are provided.

The Cell Inlet Port block 102 may be set to be compatible with either UTOPIA Level 1 or Level 2. Cells from the UTOPIA bus pass through a synchronization FIFO 112 before passing on to a data queue 114. Optionally, cells may first pass through a translation control 116 before entering the data queue 114. Translation and routing header tables to support this function are contained in an external static RAM (not shown). According to the invention, the screening of cells may be performed in the translation control 116 or in a block (not shown) between the FIFO 112 and the data queue 114. The data cells in the queue 114 are multiplexed with control information in queues 118, 120 via multiplexer 122 and passed to the CellBus® interface 108.

Cells received via the CellBus® interface 108 pass through a cell address screen 124 which screens out cells having improper addresses. Accepted cells are routed via demultiplexer 126 to either a data queue 128, a loopback queue 130, or a control queue 132. The outlet data FIFO structure is configured in external SSRAM (not shown) which interfaces with the device 100 via the interface 134. Data cells from the queue 128 pass through the SSRAM to an outlet synchronization queue 136 before passing to the outlet port 104 onto the UTOPIA bus. Loopback cells from the queue 130 are transferred to the queue 120 for transmission back through the CellBus® interface 108. Control cells pass from the queue 132 to an external microprocessor (not shown) via the interface 138. Control cells returning from the microprocessor are passed to the control queue 118 for transmission back through the CellBus® interface 108.

The preferred embodiment of the device 100 also includes a test access port 140 which conforms to the IEEE 1149.1 standard.

Figure 6:
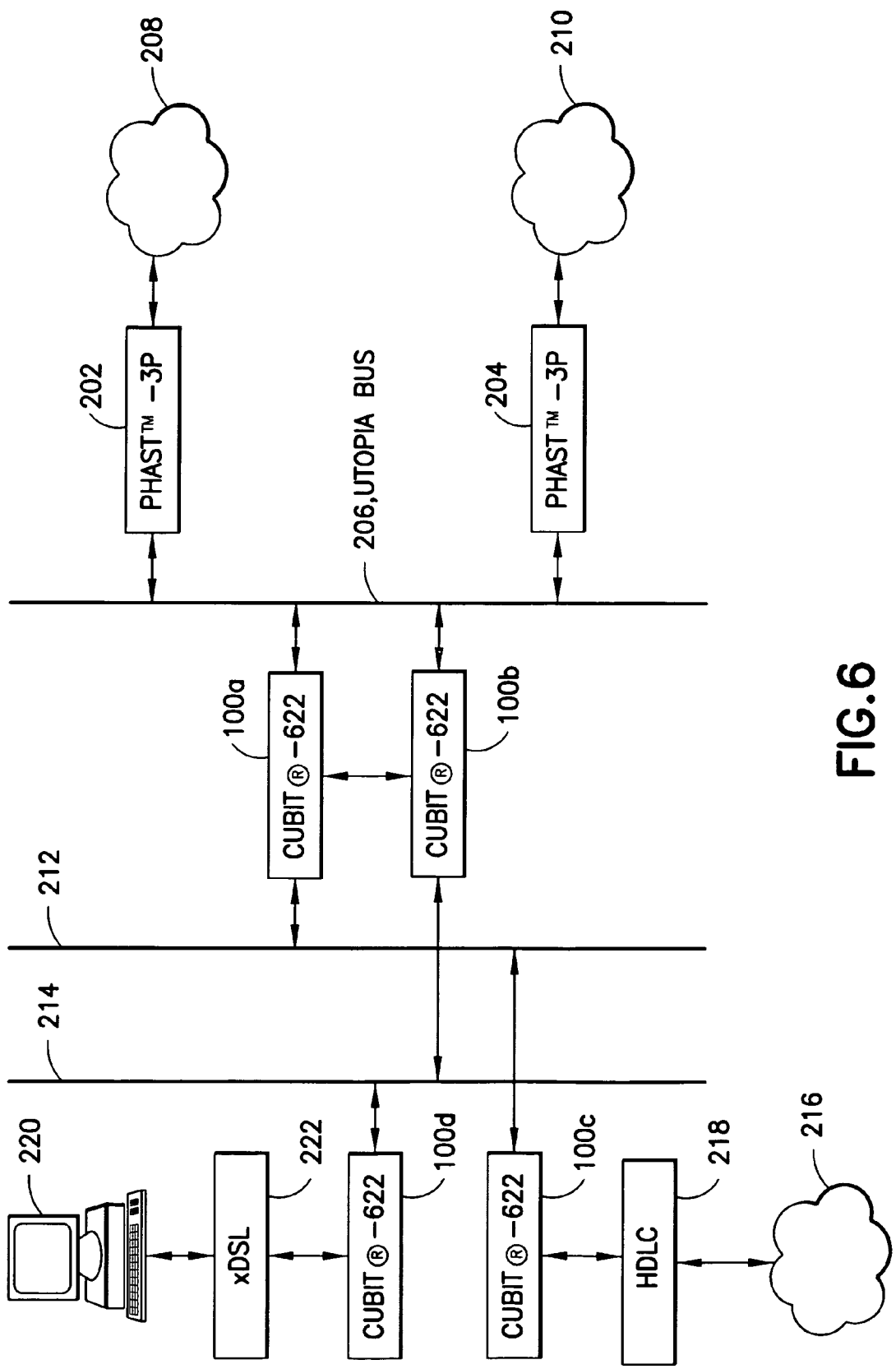
FIG. 6 is a simplified block diagram of an exemplary application of the invention.

Referring now to FIG. 6, an exemplary application of the apparatus of the invention is shown in conjunction with the Transwitch Phast™-12 SONET OC-12 uplink interface as well as other network interfaces. As shown in FIG. 6, two Phast™-3P SONET OC-3 uplink interfaces 202, 204 are coupled to a UTOPIA bus 206. The interface 202 is coupled to a first SONET OC-12 network 208 and the interface 204 is coupled to a second SONET OC-12 network 210. A first CUBIT device 100a according to the invention is coupled to the UTOPIA bus 206 and to a first bus 212 run according to a CellBus® frame (which is a repeating frame bus) as described in U.S. Pat. Nos. 6,104,724 and 5,901,146, the complete disclosures of which are hereby incorporated by reference herein. A second CUBIT® device 100b according to the invention is coupled to the UTOPIA bus 206 and to a second bus 214. The first and second devices 100a, 110b of the invention are coupled to each other as described above with reference to FIG. 3; one of them is designated the primary bus master; and the other is designated the secondary bus master. A third CUBIT® device 100c according to the invention is coupled to the first bus 212 and to a frame relay network 216 via a high level data link control 218. A fourth CUBIT® device 100d according to the invention is coupled to the second bus 214 and to an end user 220 via a digital subscriber line 222.

The exemplary arrangement shown in FIG. 6 permits two OC-12 networks to be coupled via a single UTOPIA bus to two other networks via two buses. The provision of two bus masters 100a, 100b on the UTOPIA bus 206 allows either OC-12 network 208, 210 to communicate with either of the other networks 216, 220 and vice versa.

There have been described and illustrated herein several embodiments of methods and apparatus for supporting multiple UTOPIA bus masters on a single UTOPIA bus. While particular embodiments of the invention have been described, it is not intended that the invention be limited thereto, as it is intended that the invention be as broad in scope as the art will allow and that the specification be read likewise. Thus, while examples of the invention have been disclosed with reference to a UTOPIA-CellBus® interface, it will be appreciated that invention could be applied to any ATM layer device interface with a UTOPIA bus. Also, while an exemplary implementation has been illustrated with regard to OC-12 networks, etc., it will be appreciated that the invention can be applied to any UTOPIA bus application where multiple bus masters are desirable. Further, while the invention has been disclosed with reference to three separate lines for ready, request, and grant, fewer lines could be used for all three signals.

It will therefore be appreciated by those skilled in the art that yet other modifications could be made to the provided invention without deviating from its spirit and scope as so claimed.

The invention claimed is:

1. A method for supporting two bus masters on a single Universal Test and Operations Physical Interface for ATM (UTOPIA) bus, said method comprising:
   a) coupling two bus masters to a single UTOPIA bus;
   b) designating one bus master the primary bus master and the other bus master the secondary bus master;
   c) coupling the secondary bus master to the primary bus master such that the secondary bus master can send a request signal to the primary bus master and the primary bus master can send a grant signal to the secondary bus master, wherein
      the secondary bus master is permitted to transmit to the UTOPIA bus only after sending the request signal to the primary bus master and receiving the grant signal from the primary bus master.

2. A method according to claim 1, further comprising:
   d) coupling the secondary bus master to the primary bus master such that the secondary bus master can send a ready signal to the primary bus master, wherein
      unless the secondary bus master is malfunctioning, the primary bus master is permitted to receive from the UTOPIA bus only when the secondary bus master sends the ready signal to the primary bus master.

3. A method according to claim 2, wherein:
   when the secondary bus master fails to send a ready signal to the primary bus master for more than one cell time, the primary bus master ignores the secondary bus master until the secondary bus master is reset.

4. A method according to claim 2, wherein:
   both the primary bus master and the secondary bus master receive from the UTOPIA bus at the same time.

5. A method according to claim 4, wherein:
   each of the primary bus master and the secondary bus master screen out received cells which belong to the other.

6. A method according to claim 1, wherein:
   the secondary bus master transmits to the UTOPIA bus three clock cycles after the grant signal is received.

7. A method according to claim 6, wherein:
   one of the three clock cycles is a dead cycle during which neither the primary bus master nor the secondary bus master controls the UTOPIA bus.

8. A method according to claim 1, wherein:
   the primary bus master sends a grant signal according to an arbitration scheme.

9. A method according to claim 8, wherein:
   the primary bus master and the secondary bus master alternate transmitting to the UTOPIA bus when both masters have cells to transmit.

10. A Universal Test and Operations Physical Interface for ATM (UTOPIA) bus access device, comprising:
    a) a UTOPIA interface for coupling to a UTOPIA bus;
    b) an Asynchronous Transfer Mode (ATM) layer interface for coupling to an ATM layer device;
    c) a control interface for coupling to another UTOPIA bus access device, said control interface including means for receiving a request signal from the other UTOPIA bus access device and means for sending a grant signal to the other UTOPIA bus access device.

11. A UTOPIA bus access device according to claim 10, wherein:
    said control interface includes means for receiving a ready signal from the other UTOPIA bus access device.

12. A UTOPIA bus access device according to claim 10, further comprising:
    d) arbitration means for determining when to send the grant signal to the other UTOPIA bus access device.

13. A UTOPIA bus access device according to claim 12, wherein:
    said arbitration means includes means for alternating access between said UTOPIA bus access device and the other UTOPIA bus access device when both access devices have cells to transmit.

14. A UTOPIA bus access device according to claim 10, wherein:
    said ATM layer interface is an interface to a repeating frame bus.

15. A Universal Test and Operations Physical Interface for ATM (UTOPIA) bus access device, comprising:
    a) a UTOPIA interface for coupling to a UTOPIA bus;
    b) an Asynchronous Transfer Mode (ATM) layer interface for coupling to an ATM layer device;
    c) a control interface for coupling to another UTOPIA bus access device, said control interface including means for sending a request signal to the other UTOPIA bus access device and means for receiving a grant signal from the other UTOPIA bus access device.

16. A UTOPIA bus access device according to claim 15, wherein:
    said control interface includes means for sending a ready signal to the other UTOPIA bus access device.

17. A UTOPIA bus access device according to claim 15, wherein:
    said ATM layer interface is an interface to a repeating frame bus.

18. A method for supporting two bus masters on a single Universal Test and Operations Physical Interface for ATM (UTOPIA) bus, said method comprising:
    a) coupling two bus masters to a single UTOPIA bus;
    b) designating one bus master the primary bus master and the other bus master the secondary bus master;
    c) coupling the secondary bus master to the primary bus master such that the primary bus master controls and polls the UTOPIA bus until control is given to the secondary bus master whereupon the secondary bus master controls and polls the bus from where the primary bus master left off.

19. A method for supporting two bus masters on a single Universal Test and Operations Physical Interface for ATM (UTOPIA) bus to which a plurality of physical layer devices (PHYs) are coupled, said method comprising:
    a) coupling two bus masters to a single UTOPIA bus;
    b) at least one of the bus masters polling the PHYs coupled to the bus;
    c) maintaining a scoreboard of all PHYs indicating which PHYs asserted the cell buffer available (CLAV) line in response to the most recent poll;
    d) neither bus master selecting a PHY unless the scoreboard indicates that the CLAV line was asserted; and
    e) resetting the scoreboard entry for a PHY when either bus master selects the PHY.

* * * * *